Patented Nov. 8, 1927.

1,648,137

UNITED STATES PATENT OFFICE.

ELDON L. LARISON, OF ANACONDA, MONTANA, ASSIGNOR TO ANACONDA COPPER MINING COMPANY, OF ANACONDA, MONTANA.

PROCESS FOR THE CONCENTRATION BY EVAPORATION OF PHOSPHORIC ACID.

No Drawing.   Application filed January 30, 1926. Serial No. 85,022.

Phosphate rock such as is ordinarily used for the production of phosphoric acid by treatment with sulfuric acid usually contains fluorine, sodium, and potassium compounds which appear in the crude phosphoric acid as sodium and potassium fluosilicates and, since the quantity of sodium and potassium ordinarily present is insufficient to combine with all of the hydrofluosilicic acid derived from the rock, the crude phosphoric acid ordinarily contains some free hydrofluosilicic acid.

In the concentration of such crude phosphoric acid in apparatus made of lead and other metals and alloys available for that purpose the apparatus is attacked principally by the hydrofluosilicic acid and in time destroyed.

I have observed that in the concentration of such crude phosphoric acid, as the concentration proceeds, a point is reached at which the alkali metal fluosilicates begin to precipitate or crystallize out. This precipitation of the alkali metal fluosilicates continues as the concentration of the crude acid proceeds until, at a concentration of the acid corresponding to a specific gravity of about 1.5, the precipitation of the alkali metal fluosilicate content of the acid is practically complete. The fluosilicates tend to precipitate partly in the form of firmly adherent hard crusts upon the concentrating apparatus and partly in the form of loose crystals.

It has occurred to me that this precipitation of alkali metal fluosilicates with the formation of crusts upon the concentrating apparatus during the concentration of the crude phosphoric acid might be turned to advantage not only for the recovery of the alkali metal fluosilicates as a valuable by-product and for the simultaneous purification of the crude phosphoric acid, but also for the protection of the concentrating apparatus against corrosion by the crusts formed thereon.

A practically complete recovery of the fluosilicate content of the crude acid with a simultaneous purification of the acid may be accomplished by supplying to the crude acid either before or during its concentration a quantity of a soluble alkali metal compound, such as sodium carbonate, sufficient to convert the hydrofluosilicic acid content of the crude phosphoric acid into the corresponding alkali metal fluosilicates. Incidentally, due to the neutralization of the hydrofluosilicic acid, its corrosive action upon the concentrating apparatus is largely or entirely eliminated.

For the full utilization in a practical way of the protective action of the precipitated alkali metal fluosilicate crusts several factors must be taken into consideration. In the first place the protective crusts should be formed as quickly as possible after the concentrating apparatus is put into use. Then the protective crusts should be continuously maintained; they should be firmly adherent and continuous or impervious; and they should be maintained of such thickness as to provide the desired protection to the concentrating apparatus without, however, being allowed to become so thick as to clog the apparatus or seriously interfere with the heat transfer involved in the operation of the apparatus.

The precipitation of firmly adherent coatings of the alkali metal fluosilicates upon the concentrating apparatus may be accomplished in accordance with my invention by maintaining in the concentrating apparatus or evaporator a bath of acid, the concentration of which with respect to alkali metal fluosilicates is at or above the saturation point as the concentration of the acid proceeds until the desired protective coating is formed. In starting a new concentrating apparatus it may be simply supplied with crude phosphoric acid and the concentration proceeded with in the usual way, disregarding the corrosion of the apparatus until the point of saturation with alkali metal fluosilicates is reached and the protective crust of alkali metal fluosilicate is formed or the apparatus may be supplied initially with an acid already saturated with alkali metal fluosilicate, so that a protective crust is immediately formed. The protective crust may then be built up to the desired thickness by the continued operation of the evaporating apparatus, either by withdrawing the concentrated acid and supplying fresh crude acid (batch operation) or by continuously supplying fresh crude acid at such a rate as to maintain the contents of the evaporator at the saturation point with respect to alkali fluosilicates, the latter method being preferred.

The addition of a soluble alkali metal compound to the crude acid in quantity sufficient to combine with the free hydrofluosilicic acid while resulting in the recovery of alkali metal fluosilicates as by-products and in the purification of the crude phosphoric acid and assisting the formation of the protective crusts and reducing the corrosive action of the crude acid by the neutralization of the free hydrofluosilicic acid is not essential to the formation of the protective alkali metal fluosilicate crusts. The protective coating of alkali metal fluosilicate may be formed from the normal alkali metal fluosilicate content of the crude phosphoric acid, although as is apparent the addition of sufficient alkali metal to the crude acid to combine with the free hydrofluosilicic acid is a preferred procedure.

It is noted that in adding a soluble alkali metal compound to the crude phosphoric acid the quantity so added should not be sufficient to precipitate the alkali metal fluosilicates prior to the concentration of the acid. As is known, alkali metal fluosilicates are precipitated from crude phosphoric acid solutions without concentration by the addition of a soluble alkali metal compound such as sodium carbonate in quantity sufficient to combine with the hydrofluosilicic acid and to convert a portion of the phosphoric acid content of the solution, say about 50 per cent of it, into the mono alkali metal phosphate. The quantity of soluble alkali metal compound added to the crude phosphoric acid in accordance with my invention therefore should be just sufficient to convert the hydrofluosilicic acid content of the solution into alkali metal fluosilicate without precipitating it. With crude phosphoric acid of the usual strength, say 1.2 specific gravity, the quantity of soluble alkali metal compound added may be just sufficient or only slightly in excess of the quantity necessary to combine with the free hydrofluosilicic acid in the solution.

After the alkali metal fluosilicate coating has been formed upon the concentrating apparatus, as described, and the desired thickness has been reached, the thickness is regulated by an occasional treatment with water or sulfuric acid. That is, as the apparatus is used for the concentration of more crude phosphoric acid the coating becomes thicker and thicker, and in order to prevent it from becoming so thick as to interfere with the heat transfer of the apparatus or to clog the apparatus, the concentration of acid is stopped from time to time and the apparatus filled with boiling water or sulfuric acid which dissolves the coating, this treatment being continued until the coating is reduced to the desired thickness.

This process which has been worked out in detail for the production of protective coatings upon apparatus used for the concentration of phosphoric acid apparently is applicable in other relations and in the treatment of other liquids capable of depositing adherent protective crusts.

I claim:

1. In the concentration by evaporation of crude phosphoric acid solutions containing fluorides the step of protecting the concentrating apparatus against corrosion, which consists in depositing upon the concentrating apparatus protective crusts of alkali metal fluosilicates by maintaining in the concentrating apparatus during the concentrating operation a solution of phosphoric acid saturated with respect to alkali metal fluosilicates.

2. In the concentration by evaporation of crude phosphoric acid solutions containing fluorides the steps which consist in depositing protective crusts of alkali metal fluosilicates upon the concentrating apparatus by maintaining therein during the concentrating operation solution of phosphoric acid saturated with respect to alkali metal fluosilicates, and regulating the thickness of the protective crusts by a limited treatment thereof with a solvent therefor.

3. Process of concentrating crude phosphoric acid containing hydrofluosilicic acid which comprises adding to said phosphoric acid solution an alkali metal compound soluble therein in quantity sufficient to combine with said hydrofluosilicic acid but insufficient to precipitate alkali metal fluosilicate, and subjecting the resulting phosphoric acid solution containing alkali metal fluosilicate to concentration by evaporation, whereby protective crusts of alkali metal fluosilicates are formed upon the concentrating apparatus.

In testimony whereof, I affix my signature.

ELDON L. LARISON.